C. L. WRIGHT.
THIEF ALARM FOR AUTOMOBILES.
APPLICATION FILED AUG. 13, 1919.
1,415,081.
Patented May 9, 1922.
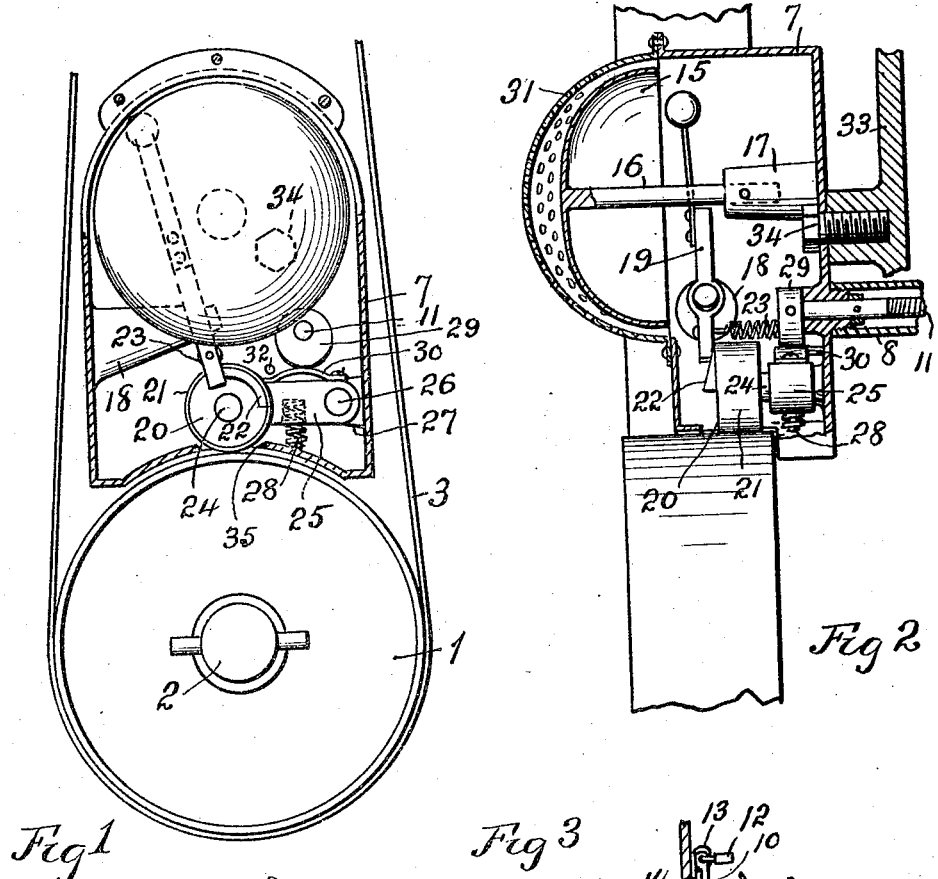
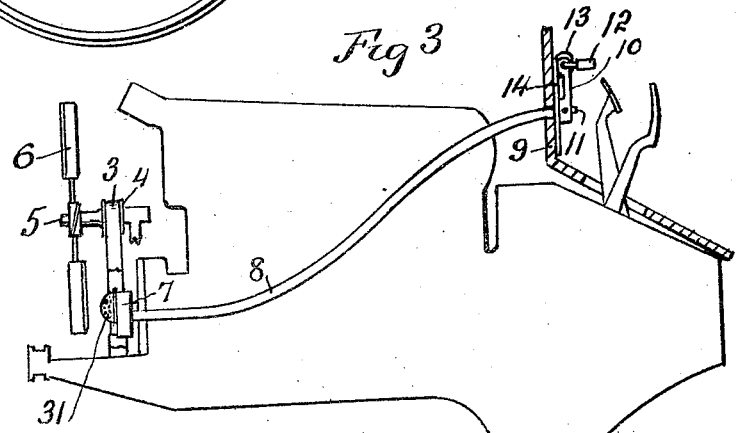
Witness:
R. E. Hamilton
Inventor
Charles L. Wright
By Warren D. House
His Attorney.

UNITED STATES PATENT OFFICE.

CHARLES L. WRIGHT, OF KANSAS CITY, MISSOURI.

THIEF ALARM FOR AUTOMOBILES.

1,415,081.     Specification of Letters Patent.    Patented May 9, 1922.

Application filed August 13, 1919. Serial No. 317,362.

*To all whom it may concern:*

Be it known that I, CHARLES L. WRIGHT, a citizen of the United States, residing at Kansas City, in the county of Jackson and State of Missouri, have invented a certain new and useful Improvement in Thief Alarms for Automobiles, of which the following is a specification.

My invention relates to improvements in thief alarms for automobiles. It relates particularly to the type of alarm in which an alarm is sounded upon the unauthorized use of the machine, when the alarm has been set for such purpose.

One of the objects of my invention is to provide an alarm of the kind described, which is simple in construction, cheap to manufacture, durable and not liable to get out of order, which can be readily applied to the machines now in use, which eliminates wiring and electro-magnetically operated mechanism, which may be readily placed in and out of condition by the owner of the machine which provides protection against fraudulent tampering with the mechanism, and which is efficient in operation.

The novel features of my invention are hereinafter fully described and claimed.

In the accompanying drawing which illustrates the preferred embodiment of my invention, Fig. 1 is a front elevation, partly broken away, of a portion of my improved alarm device shown in operative position with respect to one of the belt wheels designed to drive the fan of an automobile.

Fig. 2 is a side view, partly in elevation and partly in vertical section of what is shown in Fig. 1.

Fig. 3 is a reduced side view, partly broken away, of my improved alarm device shown mounted on an automobile, a portion of which is shown.

Similar reference characters designate similar parts in the different views.

My improvement is adapted to be operated in connection with a constantly running part of the automobile, so that, when the alarm device is properly set to give an alarm, and the engine is operated, an alarm will be given. In the drawing, the alarm device is shown in operative engagement with a pulley 1, which is rotatable with the crank shaft 2 of the automobile and which drives a belt 3 which is mounted on a pulley 4, Fig. 3, which is secured to the shaft 5 of a fan 6, of the ordinary type, such as is commonly employed for cooling the radiator of the machine.

7 designates a casing mounted between the upright portions of the belt 3 and which has connected to its rear side the forward end of a pipe 8, the rear end of which extends through the dash board 9, to which the pipe is secured. The casing 7 and pipe 8 form a housing, in which are located all of the operative parts of the alarm device excepting a crank 10 which is attached to an oscillatable flexible shaft 11 and which is adapted to be manually swung by the operator of the machine from an operative position, shown in Fig. 3, in which the crank 10 may be releasably locked by any suitable means controlled by the operator of the machine, as by a padlock 12, the hasp of which is adapted to engage the crank 10 and a perforated lug 13 mounted on a plate 14, to which the pipe 8 is attached and which is secured to the rear side of the dash board 9.

In the casing 7, is provided a gong 15 having a horizontal central stem 16, which is rigidly secured in a forwardly extending boss 17 provided on the inner side of the casing 7.

In the casing 7 is also provided a laterally extending boss 18, to which is pivoted a clapper 19, which is adapted to be swung so as to strike the gong 15 so as to give an alarm whenever the crank shaft 2 is turned.

For swinging the clapper 19, suitable means may be employed. For this purpose, I have shown a rotary member comprising preferably a wheel 20, which may have a friction covering 21, adapted to have driving engagement with the periphery of the belt wheel 1, as shown in Figs. 1 and 2.

The wheel 20 is provided on its forward side with an inclined cam 22 which is adapted every time the wheel 20 makes a revolution to strike the lower portion of the clapper 19 so as to swing the latter from the striking position. For automatically swinging the clapper to the striking position, after it has been released from the cam 22, I provide a coil spring 23, the forward end of which is attached to the clapper 19 below its pivotal point, and the rear end of which is attached to the rear side of the casing 7.

The wheel 20 is rotatably mounted upon a lateral stud 24, which is mounted on a movable support comprising preferably a swinging member 25 which is pivoted on a transverse pin 26, which is mounted in a lug 27 provided on the inner side of one side of the casing 7.

For normally swinging the member 25 upwardly so that the wheel 20 will be out of driving engagement with the pulley 1, I provide a coil spring 28, the lower end of which rests upon the bottom of the casing 7 and the upper end of which is mounted in a recess in the lower side of the swinging member 25.

When the swinging member 25 is swung so that the wheel 20 will not engage the pulley 1, the engine may be run without sounding an alarm.

For swinging the member 25 so that the wheel 20 will have driving engagement with the pulley 1, I provide on the inner end of the flexible shaft 11 a cam 29, which is adapted to bear against a flat spring 30 secured to the upper side of the member 25. When the crank 10 is swung to the operative position shown in Fig. 3, the cam 29 will force the spring 30 and member 25 to the driving position shown in Figs. 1 and 2. The padlock 12 is then applied to the crank 12 and lug 13, thus securely locking the flexible rock shaft 11 and the member 25 in the driving position.

If now the engine of the machine is run, the rotation of the crank shaft 2 will cause the pulley 1 to rotate the wheel 20, the cam 22 of which will swing the clapper 19 out of engagement with the gong 15 once during each revolution, the spring 23 serving to bring the clapper 19 against the gong 15 as soon as the clapper is disengaged from the cam 22 by the rotation of the wheel 20. An alarm will thus be sounded which will betray unauthorized use of the machine.

The casing 7 may be provided with a perforated cover 31.

When the owner desires to use the machine without having the alarm sounded, he removes the padlock 12 and turns the crank 10 so as to dispose the cam 29, so that the spring 28 can force the member 25 to a position in which the wheel 20 will be out of engagement with the pulley 1. Rotation of the wheel 20 will then cease and the alarm will no longer be sounded.

The spring 30 serves to compensate for wear of the wheel 20 and cam 29.

For limiting the upward movement of the member 25, there is provided a stop pin 32, Fig. 1, which is on the inner wall of the casing 7 and is adapted to be struck by the top of the spring 30.

The casing 7 may be attached in any suitable manner to the framework 33 of the machine.

In the drawing, there is shown for this purpose a bolt 34 which extends through the back of the casing 7 and has threaded engagement with the frame work 33.

The lower side of the casing 7 is preferably arcuate and close to the upper side of the pulley 1 so as to prevent tampering with the wheel 20, which extends through a slot 35 in the central arcuate portion of the casing 7.

I do not limit my invention to the structure shown and described, nor to its location as shown, as many modifications, within the scope of the appended claim, may be made without departing from the spirit of my invention.

What I claim is:—

In an alarm of the kind described, the combination with a running part of an automobile, of a gong, a pivoted clapper arranged to strike the gong, a pivoted member, a wheel rotatable on the pivoted member and arranged to be moved thereby into and out of driving engagement with said running part, the wheel having a cam arranged to engage the clapper and to force the latter away from the gong, a spring for normally forcing the clapper into engagement with the gong, a spring for normally forcing the pivoted member to a position in which the wheel will be disengaged from the running part, a spring carried by the pivoted member, and a manually rotatable member movable to and from a position in which it will press against the spring carried by said pivoted member in a manner such that the pivoted member will press the wheel against said running part, substantially as set forth.

In testimony whereof I have signed my name to this specification.

CHARLES L. WRIGHT.